United States Patent
Mori (10) Patent No.: US 7,312,823 B1
(45) Date of Patent: Dec. 25, 2007

(54) SOLID-STATE IMAGE PICK-UP APPARATUS AND VIDEO CAMERA LOADED WITH THE APPARATUS

(75) Inventor: Hiroshi Mori, Kanagawa (JP)

(73) Assignee: Sony Corporation, Tokyo (JP)

( * ) Notice: Subject to any disclaimer, the term of this patent is extended or adjusted under 35 U.S.C. 154(b) by 1131 days.

(21) Appl. No.: 08/634,971

(22) Filed: Apr. 19, 1996

(30) Foreign Application Priority Data

Apr. 24, 1995  (JP)  ............................. P7-098362

(51) Int. Cl.
   *H04N 9/04* (2006.01)
(52) U.S. Cl. ..................................... 348/269
(58) Field of Classification Search ................ 348/221, 348/226, 229, 230, 298, 370, 269; 257/229, 257/230

See application file for complete search history.

(56) References Cited

U.S. PATENT DOCUMENTS

| | | | | |
|---|---|---|---|---|
| 4,686,572 A | * | 8/1987 | Takatsu ....................... 348/298 |
| 4,884,142 A | * | 11/1989 | Suzuki ................... 358/213.19 |
| 5,162,914 A | * | 11/1992 | Takahashi .................... 348/229 |
| 5,293,238 A | * | 3/1994 | Nakano et al. ............. 348/229 |
| 5,463,421 A | * | 10/1995 | Deguchi et al. ............ 348/296 |
| 5,515,103 A | * | 5/1996 | Ito .............................. 348/312 |
| 5,638,120 A | * | 6/1997 | Mochizuki et al. ......... 348/296 |

FOREIGN PATENT DOCUMENTS

| | | | |
|---|---|---|---|
| JP | 61-244759 | * | 4/1988 |
| JP | 02-056182 | * | 2/1990 |

* cited by examiner

*Primary Examiner*—Lin Ye
*Assistant Examiner*—James M. Hannett
(74) *Attorney, Agent, or Firm*—Sonnenschein Nath & Rosenthal LLP (57) ABSTRACT

A solid-state image pick-up apparatus that is capable of suppressing luminance flicker and chroma flicker occurring under a florescent lamp. The apparatus has a CCD solid-state image pick-up device. The image pick-up device further includes an accumulation region that is able to temporarily accumulate signal charges that have been photoelectrically converted in a sensor unit. The device is able to exercise exposure control with the use of an electronic shutter. The apparatus also has a timing generating circuit that generates a shutter pulse XSUB and a read pulse XSG. The shutter pulse XSUB is used for determining a plurality of (for example, three) exposure periods during one field for the image pick-up device. The read pulse XSG is used for reading to the accumulation region the signal charges that have been accumulated in the sensor unit during a plurality of exposure periods.

20 Claims, 6 Drawing Sheets

Conventional Device

FIG. 8

Conventional Device

FIG. 9

Conventional Device

SOLID-STATE IMAGE PICK-UP APPARATUS AND VIDEO CAMERA LOADED WITH THE APPARATUS

BACKGROUND OF THE INVENTION

1. Field of the Invention

The present invention relates to a solid-state image pick-up apparatus and a video camera loaded with this apparatus. More particularly, the invention relates to a solid-state image pick-up apparatus using a solid-state image pick-up device that is able to perform operations with the use of an electronic shutter. The invention also relates to a video camera loaded with this type of apparatus.

2. Description of the Related Art

Figure 7:
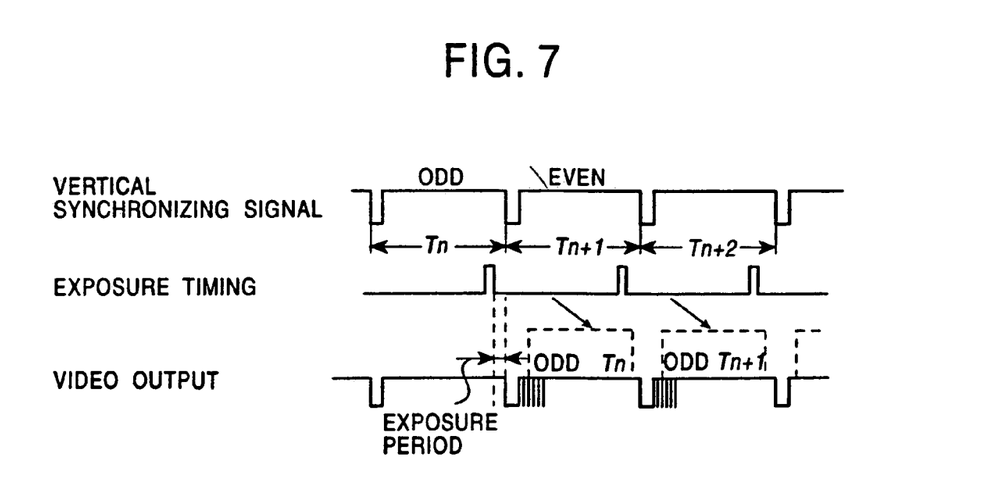
FIG. 7 is a timing chart illustrating the operation of the electronic shutter.

Some solid-state image pick-up devices execute electrical iris control for adjusting the exposure time according to the brightness of a subject. This iris control is exercised by the use of an electronic shutter that can vary the accumulation time (exposure time) of signal charges in a sensor unit. The basic principle of this control is that signal charges are caused to accumulate for a desired period immediately before reading the signal charges (optical charges) in the sensor unit and the charges accumulated before this period are swept away to a different place (for example, a substrate). FIG. 7 is a timing chart for illustrating the operation of the electronic shutter. Signal charges are read into the vertical transfer registers from the sensor unit at a timing in synchronization with the vertical synchronizing signal VD. A certain period (exposure timing) before the reading timing, a shutter pulse is applied to the substrate so that the signal charges accumulated in the sensor unit before this period can be swept away to, for example, the substrate. The period from the exposure timing until the reading timing is determined as an exposure period (exposure time).

Figure 8:
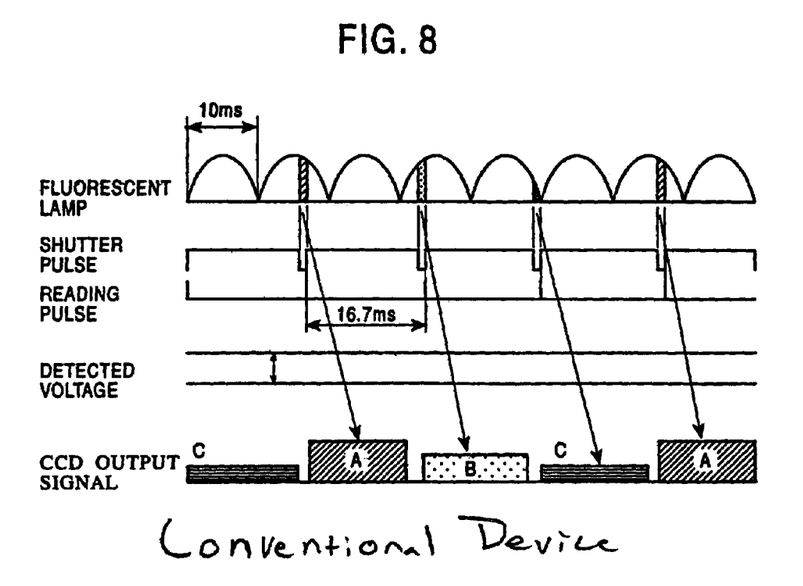
FIG. 8 is a timing chart of an example of conventional CCD solid-state image pick-up apparatuses.
Figure 9:
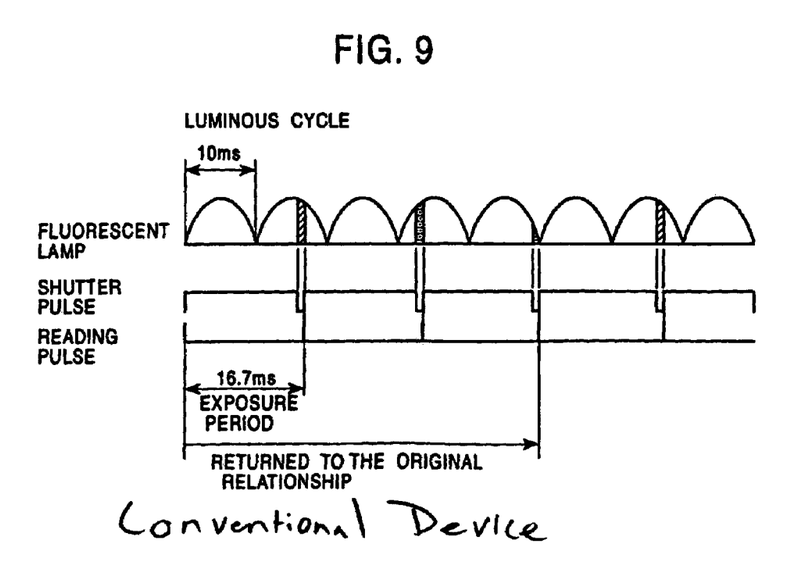
FIG. 9 is a timing chart indicating the relationship between the luminous cycle of a fluorescent lamp and the exposure operation of the conventional CCD solid-state image pick-up device.

The conventional solid-state image pick-up apparatus using the above type of the image pick-up device presents no problem when it is used under a light source providing constant illumination with the same level of brightness. However, the following problems are encountered by this apparatus when the apparatus is used under a light source, such as a fluorescent lamp, having periodic luminous characteristics and out of synchronization with the exposure cycle of the solid-state image pick-up device. For example, when a solid-state image pick-up device that performs exposure at 60 Hz is used in a combination with a fluorescent lamp emitting light at 100 Hz, flicker occurs, as shown in FIG. 8. More specifically, since the luminous cycle of the fluorescent light is 10 ms, and one cycle of the exposure operation performed at 60 Hz is 16.7 ms, the least common multiple results in 50 ms. As is seen from FIG. 9, after the exposure operation has been performed three times, the relationship between the two cycles returns to the original state in which the operation has started. Thus, there are three types of relationships of the exposure periods to the luminous cycle, and a significant difference in the output signal level of the image pick-up device is exhibited between the exposure periods. This causes flicker (luminance flicker) at 20 Hz.

This luminance flicker is intensified as the shutter speed increases, thereby seriously deteriorates the image quality, since flicker appears on the screen. It is known that $\frac{1}{100}$-second electronic shutter is effective for inhibiting flicker when a solid-state image pick-up device (NTSC/EIA) performing exposure at 60 Hz is used in a combination with a fluorescent lamp emitting light at 100 Hz. However, this makes it impossible to perform exposure control by use of the electronic shutter. There is, in general, a significant difference in the color temperature of the fluorescent lamp depending on the luminous timing. Namely, the fluorescent lamp emits light with different color temperatures during the respective exposure periods for which signals A, B and C shown in FIG. 8 are obtained. This causes flicker of chroma signals (chroma flicker) in a color system, generating an image having the different levels of white balance between the fields and seriously degrading the image quality. This originates from due to the frequency of the exposure operation being lower than the luminous frequency of the fluorescent lamp, causing the aliasing component to emerge in the lower frequency band.

SUMMARY OF THE INVENTION

Accordingly, in view of the above background, it is an object of the present invention to provide a solid-state image pick-up apparatus that is capable of inhibiting luminance flicker and chroma flicker occurring under a fluorescent lamp.

In order to achieve the above object, according to one aspect of the present invention, there is provided a video camera comprising: a solid-state image pick-up device; and a timing generating circuit for setting a plurality of discrete exposure periods during one field for the solid-state image pick-up device.

According to another aspect of the present invention, there is provided a video camera comprising: a solid-state image pick-up device including a sensor unit, an accumulation region disposed corresponding to the sensor unit through a read gate, and discharge means for discharging signal charges from the sensor unit in response to a shutter pulse, the signal charges accumulated in the sensor unit being read to the accumulation region in response to a read pulse; and a timing generating circuit for generating the shutter pulse and the read pulse, the shutter pulse determining a plurality of discrete exposure periods during one field for the solid-state image pick-up device.

According to still another aspect of the present invention, there is provided a method for driving a video camera that performs an image pick-up operation under a light source having periodic luminous characteristics, the video camera comprising: a solid-state image pick-up device including a sensor unit, an accumulation region disposed corresponding to the sensor unit through a read gate, and discharge means for discharging signal charges from the sensor unit in response to a shutter pulse, the signal charges accumulated in the sensor unit being read to the accumulation region in response to a read pulse; and a timing generating circuit for generating the shutter pulse and the read pulse, the shutter pulse determining a plurality of discrete exposure periods during one field for the solid-state image pick-up device, the method comprising the steps of: discharging signal charges from the sensor unit by changing the shutter pulse to a first level at a required timing during one field; accumulating the signal charges in the sensor unit during a predetermined first exposure period by changing the shutter pulse to a second level; reading first signal charges accumulated in the sensor unit to the accumulation region after a lapse of the first exposure period by generating the read pulse; discharging the signal charges from the sensor unit by changing the shutter pulse to the first level at a required timing; accumulating the signal charges in the sensor unit during a predetermined second exposure period by changing the shutter pulse to the second level; and reading second signal charges accumulated in the sensor unit to the accumulation region after a lapse of the second exposure period by generating the read pulse, and adding the second signal charges to the first signal charges.

According to the solid-state image pick-up apparatus constructed as described above, the timing of generating the shutter pulse to be applied to the solid-state image pick-up device from the timing generating circuit is controlled. This makes it possible to set a plurality of exposure periods for the pick-up device during one field. The signal charges accumulated in the sensor section during a plurality of exposure periods are read to the accumulation region by applying a read pulse to the pick-up device from the timing generating circuit after a lapse of the respective exposure periods. The signal charges accumulated during the respective exposure periods are added in the accumulation region and then transferred to be output.

DESCRIPTION OF THE PREFERRED EMBODIMENT

An embodiment of the present invention will now be described in detail with reference to the drawings.

Figure 1:
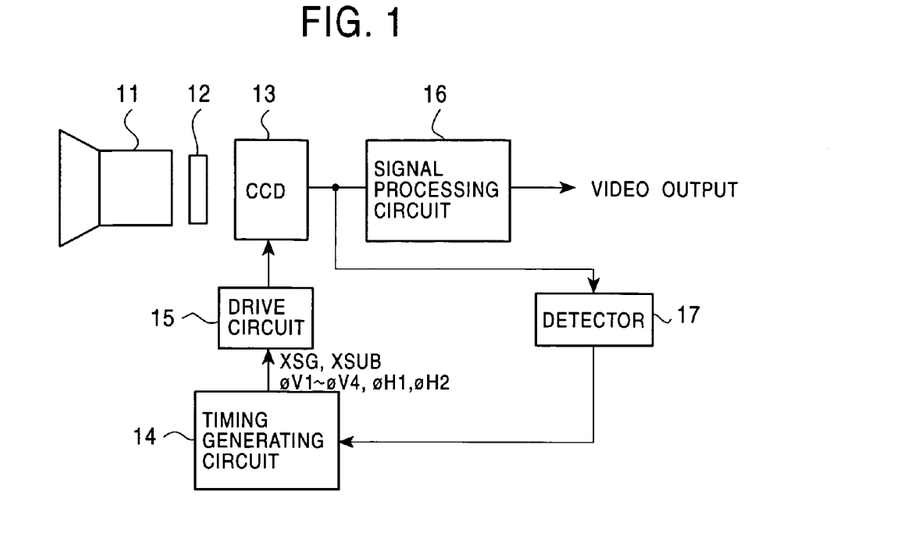
FIG. 1 is a schematic diagram of an embodiment of a video camera according to the present invention.

FIG. 1 is a schematic diagram of the configuration of an embodiment of the present invention by its application to a color video camera. Referring to FIG. 1, after light from a subject enters a lens 11 and passes through an optical filter 12, it impinges on an image section of a CCD solid-state image pick-up device 13. The CCD solid-state image pick-up device 13 is driven by a drive circuit 15 based on various timing signals generated in a timing generating circuit 14. A CCD output signal of the image pick-up device 13 undergoes various types of signal processing in a signal processing circuit 16 and is then output as a video output. The output signal of the image pick-up device 13 is also detected in a detector 17, and the detected output is sent to the timing generating circuit 14. The timing generating circuit 14 sets a subsequent exposure period based on this detected output. According to the procedure discussed above, automatic iris control is exercised.

The timing generating circuit 14 generates various types of timing signals and sends them to the image pick-up device 13: such as a read pulse XSG for reading signal charges accumulated in a sensor unit into vertical transfer registers; a shutter pulse XSUB for sweeping away signal charges accumulated in the sensor unit to, for example, a substrate; vertical transfer clocks $\phi V1$ to $\phi V4$ for, for example, four-phase driving the vertical transfer registers; and horizontal transfer clocks $\phi H1$ and $\phi H2$ for, for example, two-phase driving the horizontal transfer register.

An explanation will now be given by way of example of a combination of a fluorescent lamp emitting light at 100 Hz and a CCD solid-state image pick-up device repeatedly performing exposures at 60 Hz. According to a conventional technique, there is only one exposure period in one field. In this embodiment, on the other hand, the generating timings of the shutter pulse XSUB and the read pulse XSG in the timing generating circuit 14 are controlled, whereby a plurality of exposure periods can be set in one field. It is also possible to adjust the shutter speed for each exposure period so that the total exposure time during one field becomes equal to that of the conventional technique. In this embodiment, the exposure period is divided into three portions during one field by way of example.

Figure 2:
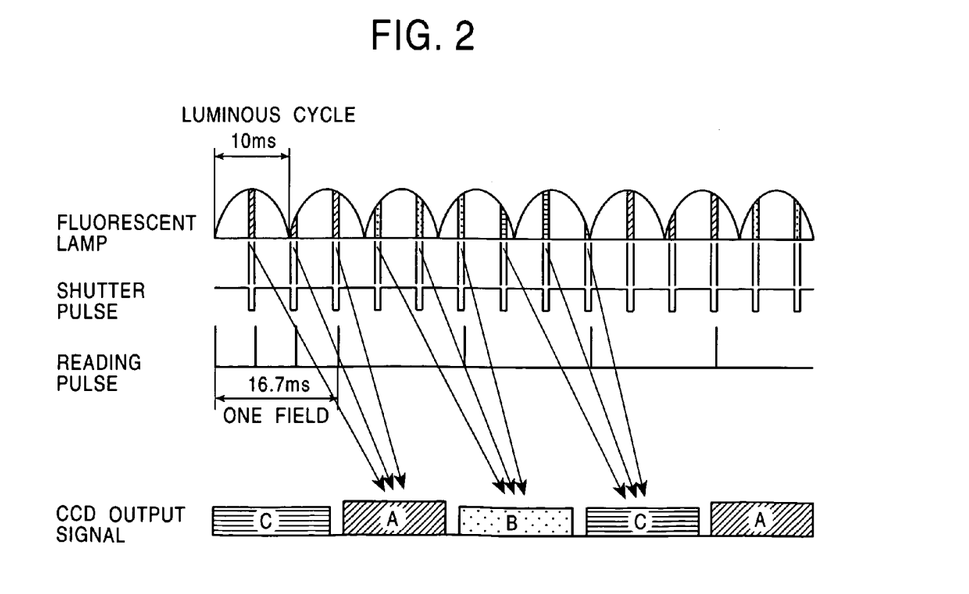
FIG. 2 is a timing chart of an embodiment of the present invention.

Since the exposure period during one field is divided into a plurality of portions as described above, the exposure operation is performed over a few points of the luminous timing in the time domain during synchronization, as shown in the timing chart of FIG. 2. Each of the resulting CCD output signals contains information concerning the averaged luminous brightness and the averaged luminous color temperature of the different points, thereby suppressing the level difference of the CCD output signals between the fields to a smaller level. This can reduce aliasing of the luminance information and chroma information resulting from a low sampling frequency, which problem is suffered from the known technique when image pick-up operation is carried out under a fluorescent lamp, particularly while a high-speed electronic shutter is operated, thereby suppressing luminance flicker and chroma flicker. It is desirable that the durations of the divided exposure periods be equal and the intervals of the periods be also equal. In other words, a desired exposure period determined by exercising the iris control is divided so that the divided portions can be equally distributed in one field. This makes it possible to effectively suppress luminance flicker and chroma flicker with respect to various luminous cycles of a subject. The number of exposure periods to be divided and the intervals of the periods may be adjusted according to the luminous cycle of the subject.

This embodiment has been explained by the example in which the exposure period of one field is divided into three portions. However, this is not exclusive, the number of the exposure periods to be divided may be increased, whereby the luminance flicker and chroma flicker can be suppressed more effectively. Additionally, although this embodiment has been explained by the example in which the CCD solid-state image pick-up apparatus operable at 60 Hz is used in a combination with the fluorescent lamp emitting light at 100 Hz, the present invention is not restricted to such a combination.

Figure 3:
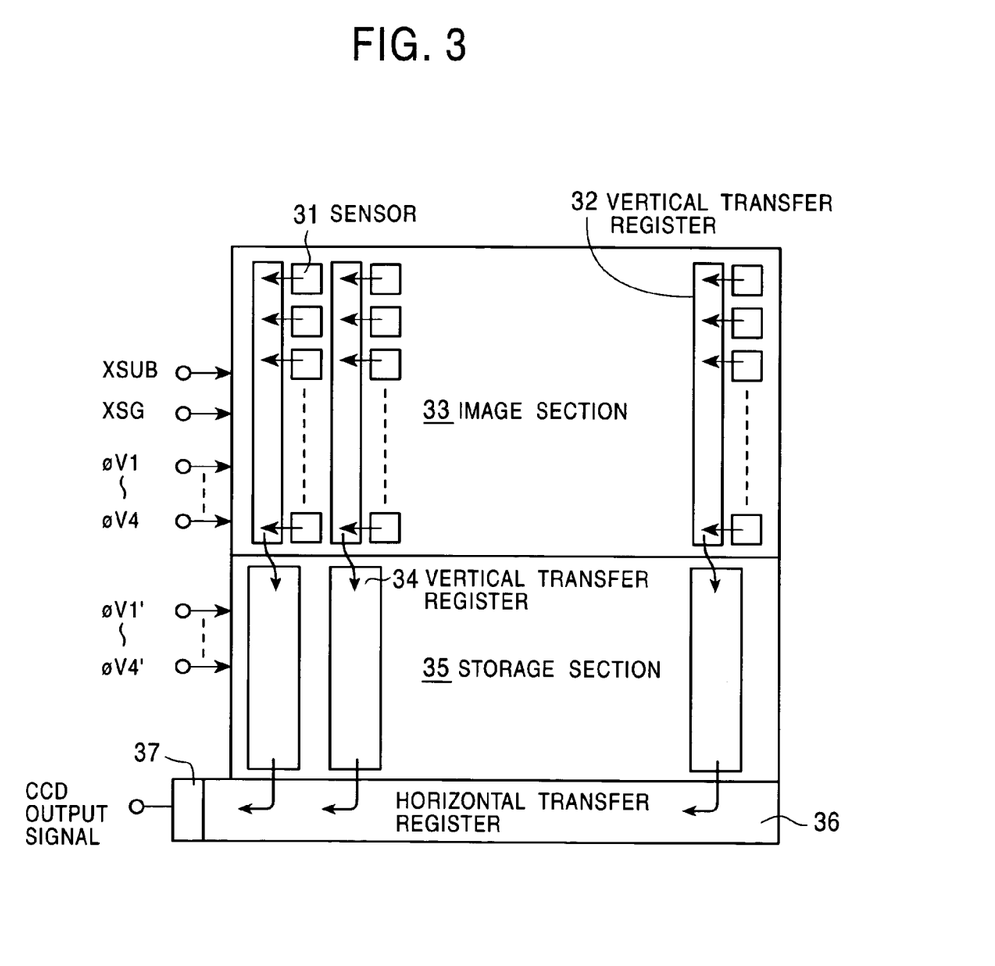
FIG. 3 is a schematic diagram of a CCD solid-state image pick-up device used in a specific example of the present invention.

In order to implement the above-described embodiment, it is necessary to add the signal charges which have been read a plurality of times during one field period. This further requires that the CCD solid-state image pick-up device possesses an accumulation function for temporarily accumulating signal charges read out from the sensor unit. A specific example of the image pick-up device of this type will now be explained. FIG. 3 illustrates an example of the frame interline transfer (FIT)-type CCD solid-state image pick-up device 13.

Referring to FIG. 3, an image section 33 is comprised of a plurality of sensors 31 and a plurality of vertical transfer registers 32. The sensors 31 are arranged in a matrix in the row direction (horizontal direction) and in the column direction (vertical direction) and convert incident light into signal charges corresponding to the quantity of the light and accumulate them. The vertical transfer registers 32 are each disposed adjacent to a group of sensors 31 in the vertical direction and transfer the signal charges read out from the sensors 31 in the vertical direction. Disposed below the image section 33 as viewed from FIG. 3 is a storage section 35 formed of a plurality of vertical transfer registers 34 that correspond to the respective vertical transfer registers 32 in the vertical direction. The image section 33, except the openings for the sensors 31, is covered with a light-screening film formed of aluminum or the like, while the storage section 35 is completely covered with a light-screening film.

In the image section 33, the signal charges subjected to photoelectric conversion performed by the sensors 31 are read into the vertical transfer registers 32 and then transferred to the storage section 35 at high speed by the transfer registers 32. The signal charges are further transferred, by the amount corresponding to one line, to a horizontal transfer register 36 by the vertical transfer registers 34. The signal charges for one line are sequentially transferred by the horizontal transfer register 36 in the horizontal direction. A charge detecting section 37 comprised of a floating diffusion amplifier is provided for the output terminal of the horizontal transfer register 36. The charge detecting section 37 converts the signal charges transferred by the horizontal transfer register 36 into a signal voltage and outputs it as a CCD signal.

Figure 4:
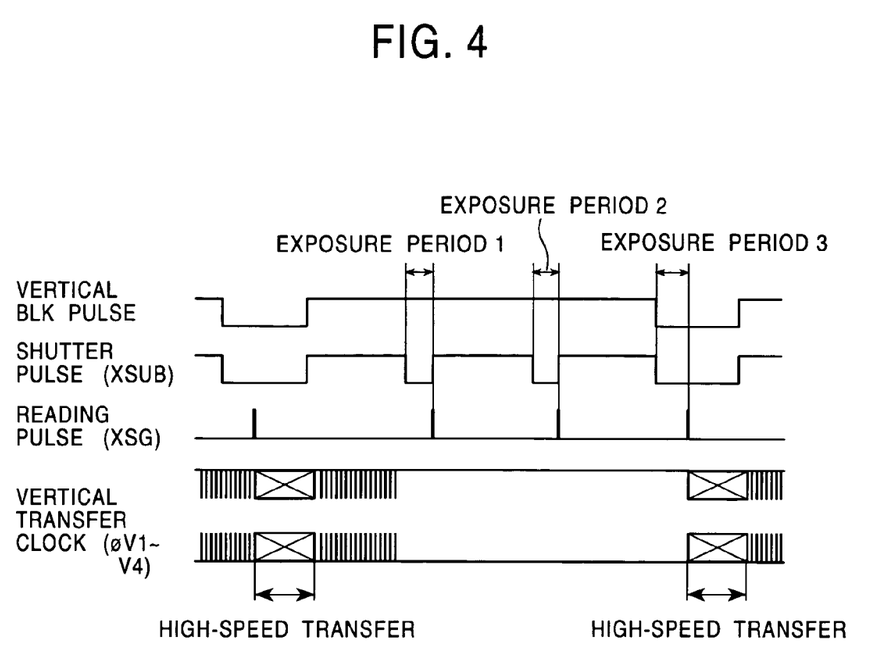
FIG. 4 is a timing chart of the above example.

The exposure operation of the above specific example will now be explained with reference to the timing chart of FIG. 4. The signal charges subjected to photoelectric conversion in the sensors 31 are first swept away to a substrate, which functions as a shutter drain, by applying a high-level shutter pulse XSUB to the substrate. During the exposure periods, however, the signal charges after the photoelectric conversion has been performed are accumulated in the sensors 31, since the shutter pulse XSUB is changed to a low level. After a lapse of a first exposure period, the read pulse XSG is applied to a read gate (not shown), whereby the signal charges are read to the vertical transfer registers 32. When the shutter pulse XSUB is once again changed to a high level, the sweeping operation of the unnecessary signal charges to the substrate is started. The foregoing operation is repeated a plurality of times (three times in this embodiment).

In this manner, the signal charges are accumulated in the sensors 31 during the respective exposure periods 1 to 3 and are then read to the vertical transfer registers 32 from the sensors 31 by the reading operations three times. The resulting signal charges are then added in the vertical transfer registers 32. The vertical transfer clocks φV1 to φV4 for driving the vertical transfer registers 32 are suspended throughout the exposure periods (that is, the time from when the first exposure period (exposure period 1) is started until when the third exposure period (exposure period 3) is ended). After a lapse of one field, the vertical transfer clocks φV1 to φV4 and φV1, to φV4' for driving the vertical transfer registers 32 and 34, respectively, become higher than the frequency during the normal transfer operation, whereby the signal charges are transferred to the storage section 35 at high speed from the vertical transfer registers 32 and further sequentially sent to the horizontal transfer register 36. The charges are horizontally transferred and then output as a CCD signal. Meanwhile, during this period, some signal charges of a subsequent field are swept away to the substrate, while some signal charges are accumulated in the sensors 31. According to the procedure as discussed above, the exposure operations can be performed a plurality of times during one field.

Figure 5:
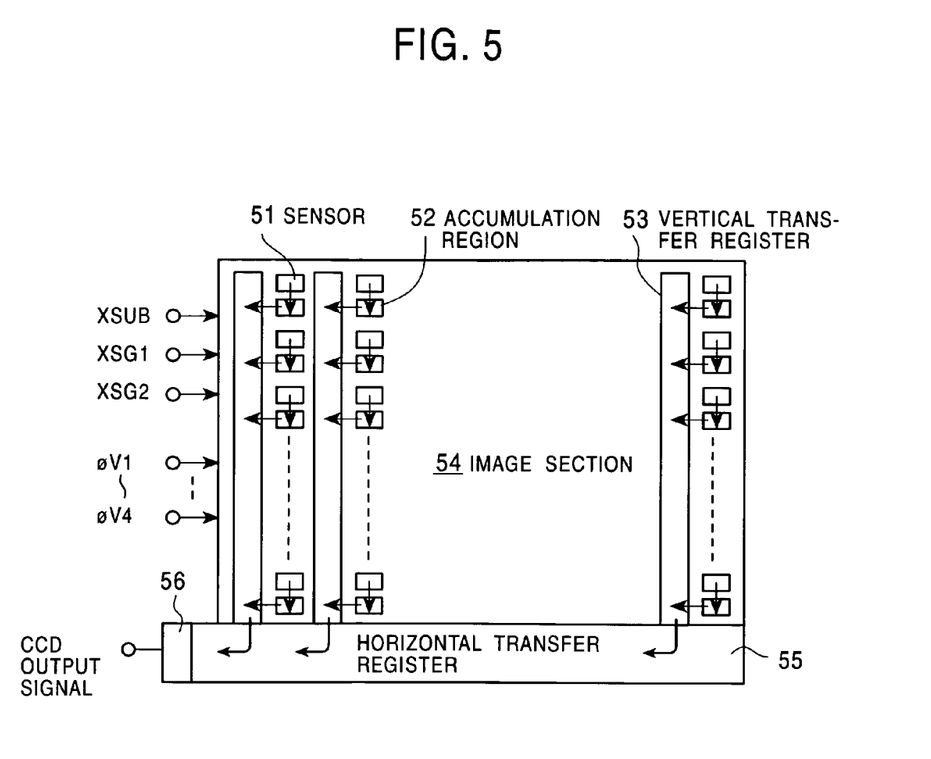
FIG. 5 is a schematic diagram of a CCD solid-state image pick-up device used in another specific example of the present invention.

FIG. 5 illustrates another specific example of the CCD solid-state image pick-up device 13. This device 13 has accumulation regions each located adjacent to a sensor. In FIG. 5, disposed in proximity to each of a plurality of sensors 51 arranged in a matrix is an accumulation region 52 for temporarily accumulating signal charges which have been photoelectrically converted and accumulated in the sensor 51. The signal charges temporarily accumulated in the accumulation regions 52 are then read to a vertical transfer register 53 via a read gate (not shown). The sensors 51, the accumulation regions 52 and the vertical transfer registers 53 form an image section 54. As the CCD solid-state image pick-up device constructed in such a manner that the accumulation regions 52 are provided in proximity to the respective sensors 51, the device disclosed in Japanese Patent Laid-Open No. 2-56182 may be used.

In the image section 54, the signal charges read to the vertical transfer registers 53 are sequentially transferred by the amount corresponding to one line in the vertical direction during the partial horizontal blanking period. Disposed below the image section 54 as viewed from FIG. 5 is a horizontal transfer register 55 for sequentially transferring from a plurality of vertical transfer registers 53 the signal charges by the amount corresponding to one line. The signal charges for one line transferred to the horizontal transfer register 55 are sequentially transferred in the horizontal direction during the horizontal scanning operation of the horizontal blanking period. A charge detecting section 56 formed of, for example, a floating diffusion amplifier, is further provided for the output terminal of the horizontal transfer register 55. The charge detecting section 56 converts signal charges into a signal voltage and outputs it as a CCD signal.

Figure 6:
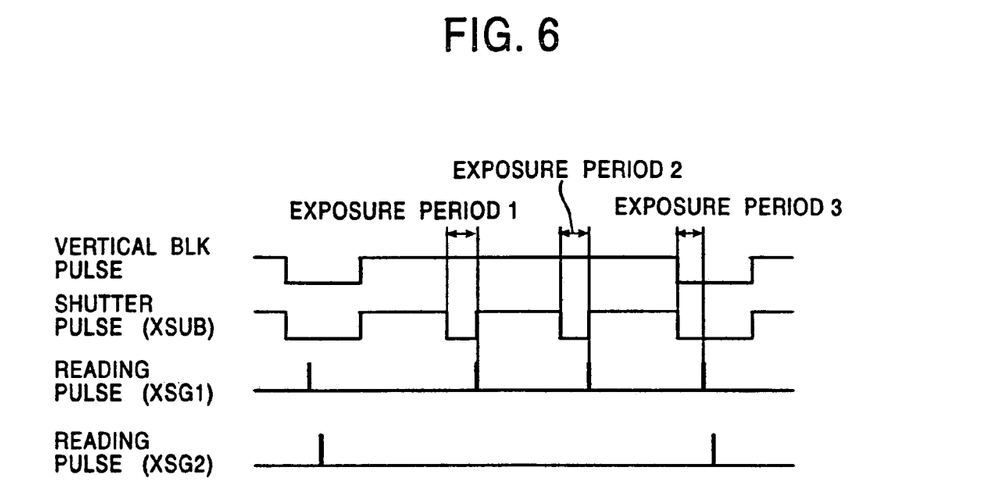
FIG. 6 is a timing chart of the above specific example.

An explanation will further be given with reference to the timing chart of FIG. 6 of the exposure operation of the above specific example of the image pick-up device 13. The photoelectrically-converted signal charges in the sensors 51 are first swept away to the substrate by applying a high-level shutter pulse XSUB to the substrate. During the exposure periods, however, the signal charges after the photoelectric conversion has been performed are accumulated in the sensors 51, since the shutter pulse XSUB is changed to a low level. After a lapse of a certain exposure period, the read pulse XSG1 is applied to a read gate (not shown), whereby the signal charges are read to the accumulation regions 52 from the respective sensors 51.

The resulting signal charges are temporarily stored in the accumulation regions 52. The shutter pulse XSUB is changed to a high level once again, whereby the sweeping operation of unnecessary signal charges to the substrate is started. The foregoing operation is repeated a plurality of times (three times in this example). In this manner, the signal charges are accumulated in the sensors 51 during the exposure periods 1 to 3 and read from the sensors 51 to the respective accumulation regions 52 by the reading operations three times. The resulting charges are then added in the accumulation regions 52. After a lapse of one field, by the application of a read pulse XSG2 to a read gate (not shown), the signal charges added and accumulated in the accumulation regions 52 are read to the vertical transfer registers 53 and further sequentially transferred to the horizontal transfer register 55. The charges are then horizontally transferred and output as a CCD signal. According to the above procedure, the exposure operation can be carried out a plurality of times during one field.

The application of the present invention is not restricted to the CCD solid-state image pick-up device constructed in the above specific examples. Instead, the invention is extensively applicable to any solid-state image pick-up device of the type which can temporarily accumulate signal charges undergoing photoelectric conversion in sensors.

As will be clearly understood from the foregoing description, the present invention offers the following advantages. The present invention employs a solid-state image pick-up device which has accumulation regions that can temporarily accumulate signal charges subjected to photoelectric conversion in sensors and which is able to perform exposure control with the use of an electronic shutter. A plurality of exposure periods can thus be set during one field, whereby exposure operations can be performed over some points of the luminous timing of a fluorescent lamp. This makes it possible to decrease the level difference of the output signals of the image pick-up device between the respective fields, thereby suppressing luminance flicker and chroma flicker.

What is claimed is:

1. A video camera having a video imaging frequency at which images are acquired, such image acquisition occurring over a video imaging cycle, comprising:
   a solid-state image pick-up device having a plurality of sensors respectively associated with a like plurality of pixels, said sensors photoelectrically converting an image into respective image charges during an exposure period;
   a timing generating circuit for setting a plurality of discrete exposure periods during one video imaging cycle for said solid-state image pick-up device; and
   a charge storage section configured to store respective image charges of said plurality of pixels for each of said discrete exposure periods, and, for each pixel, to respectively accumulate during an image cycle said image charges generated during said exposure periods before said image charges are converted to image signals;
   wherein,
   said exposure periods are discontinuous with a discharge period between adjacent exposure periods,
   said video imaging frequency is less than an average flicker frequency of a source of luminous flicker,
   said exposure periods occur at a rate greater than said average flicker frequency,
   a respective amount of each of said exposure periods generated during one imaging cycle is shorter than said one imaging cycle, and
   said charge storage section comprises a plurality of storage locations arranged along a vertical direction to which said image charges are transferred from said sensors following each shutter pulse, charges from a given sensor being additively accumulated in a respective storage location during a video imaging cycle.

2. A video camera according to claim 1, wherein said video camera is a color video camera.

3. A video camera according to claim 1, further comprising automatic iris control means.

4. A video camera according to claim 1, wherein the durations of said plurality of exposure periods are equal.

5. A video camera according to claim 1, wherein the intervals between said plurality of exposure periods are equal.

6. The video camera of claim 1, wherein said charge storage location comprises:
   an accumulation region having a storage region respectively associated with each respective image sensor, image signals being transferred from a sensor to its respective storage region following each shutter pulse, a given storage region additively accumulating image charges for a respective sensor during a video image cycle; and
   a vertical transfer register to which image charges so accumulated are transferred following each video image cycle.

7. A video camera having a video imaging frequency at which images are acquired from a source of luminous flicker during a video imaging cycle, the camera comprising:
   a solid-state image pick-up device including a sensor unit which generates a plurality of image charges related to pixels of the sensor unit, an accumulation region disposed operatively with said sensor unit, and discharge means for discharging image charges from said sensor unit to said accumulation region in response to shutter pulses, the signal charges accumulated in said sensor unit being read out from said accumulation region to a vertical transfer register in response to read pulses; and
   a timing generating circuit generating said shutter pulses and said read pulses, said shutter pulses determining a plurality of discrete exposure periods during which signal charges are generated by said sensor unit, said timing generating circuit generating a plurality of said shutter pulses during one video imaging cycle for said solid-state image pick-up device and said read pulses determining said video image cycles during which the accumulation region stores and accumulates respective image charges of a plurality of pixels for said discrete exposure periods;
   wherein,
   said exposure periods are discontinuous with a discharge period between adjacent exposure periods,
   said video imaging frequency is less than an average flicker frequency of said source of luminous flicker,
   said exposure periods occur at a rate greater than said average flicker frequency,
   each of said exposure periods generated during one imaging cycle is shorter than said one imaging cycle, and
   said shutter pulses are generated at a rate greater than that at which said read pulses are generated.

8. A video camera according to claim 7, wherein said video camera is a color video camera.

9. A video camera according to claim 7, further comprising automatic iris control means.

10. A video camera according to claim 7, wherein the durations of said plurality of exposure periods are equal.

11. A video camera according to claim 7, wherein the intervals of said plurality of exposure periods are equal.

12. A video camera as set forth in claim 7, wherein the vertical transfer register has a plurality of storage locations and charges from a given sensor are additively accumulated in a respective storage location during a video image cycle.

13. The video camera of claim 7, wherein said accumulated region comprises a charge storage section having a storage region respectively associated with each respective image sensor, image signals being transferred from a sensor to its respective storage region following each shutter pulse, a given storage region additively accumulating image charges for a respective sensor during a video image cycle.

14. A method for driving a video camera having a video imaging frequency at which images are acquired during a video imaging cycle from a light source having periodic luminous characteristics, said video camera comprising:
- a solid-state image pick-up device including a sensor unit, an accumulation region disposed operatively in association with said sensor unit, and discharge means for discharging signal charges from said sensor unit to said accumulation region in response to shutter pulses in a shutter pulse signal, the signal charges accumulated in said sensor unit being read out from said accumulation region to a vertical transfer register in response to read pulses; and
- a timing generating circuit for generating the shutter pulses and the read pulses, said method comprising the steps of:
- generating said shutter pulses at a rate greater than a frequency of said periodic luminous characteristics and at a rate greater than a frequency of said read pulses;
- discharging signal charges from said sensor unit to said accumulation region by changing a given shutter pulses to a first level at a required timing during one video image cycle;
- generating the signal charges in said sensor unit during a predetermined first exposure period by changing said shutter pulses to a second level;
- accumulating a plurality of said charges generated in said sensor unit and discharged to the accumulation region in said accumulation region after a lapse of said first exposure period following said shutter pulse;
- discharging the image charges from said sensor unit by changing said shutter pulse to the first level at a required timing;
- accumulating the signal charges in said sensor unit during a predetermined second exposure period by changing said shutter pulse to the second level; and
- reading a plurality of second signal charges accumulated in said sensor unit to said accumulation region after a lapse of said second exposure period by generating said read pulse, and adding corresponding ones of said second signal charges to said first signal charges;

wherein:
- said exposure periods are discontinuous with a discharge period between adjacent exposure periods,
- said video imaging frequency is less than an average flicker frequency of the light source having periodic luminous characteristics,
- said exposure periods occur at a rate greater than said average flicker frequency, and
- each of said exposure periods generated during one imaging cycle is shorter than said one imaging cycle.

15. A method for driving a video camera according to claim 14, wherein said video camera is a color video camera.

16. A method for driving a video camera according to claim 14, said video camera further comprises automatic iris control means.

17. A method for driving a video camera according to claim 14, wherein the durations of said plurality of exposure periods are equal.

18. A method for driving a video camera according to claim 14, wherein the intervals of said plurality of exposure periods are equal.

19. A video camera as set forth in claim 14, wherein the vertical transfer register has a plurality of storage locations and charges from a given sensor are additively accumulated in a respective storage location during a video image cycle.

20. The video camera of claim 14, wherein said accumulated region comprises a charge storage section having a storage region respectively associated with each respective image sensor, image signals being transferred from a sensor to its respective storage region following each shutter pulse, a given storage region additively accumulating image charges for a respective sensor during a video image cycle.

* * * * *